United States Patent
Yang et al.

(10) Patent No.: US 8,785,063 B2
(45) Date of Patent: Jul. 22, 2014

(54) FUEL CELL STACK WITH WATER DRAINAGE STRUCTURE

(75) Inventors: Yoo Chang Yang, Gyeonggi-do (KR); Jong Sung Kim, Gyeonggi-do (KR); Sae Hoon Kim, Gyeonggi-do (KR); Sang Mun Jin, Seoul (KR); Suk Min Baeck, Gyeonggi-do (KR); Seong Il Heo, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 558 days.

(21) Appl. No.: 13/080,406

(22) Filed: Apr. 5, 2011

(65) Prior Publication Data

US 2012/0121997 A1     May 17, 2012

(30) Foreign Application Priority Data

Nov. 17, 2010   (KR) .................. 10-2010-0114180

(51) Int. Cl.
    *H01M 8/06*    (2006.01)
(52) U.S. Cl.
    USPC ....................................... 429/414

(58) Field of Classification Search
    USPC ........................................... 429/414
    See application file for complete search history.

(56) References Cited

U.S. PATENT DOCUMENTS

| 6,040,072 | A    | 3/2000  | Murphy et al. |
| 6,670,069 | B2   | 12/2003 | Allen |
| 7,163,760 | B2 * | 1/2007  | Tanaka et al. ............ 429/413 |
| 7,588,851 | B2 * | 9/2009  | Asai et al. .............. 429/434 |
| 2005/0095492 | A1 | 5/2005 | Frank et al. |

FOREIGN PATENT DOCUMENTS

| JP | 2008226713 A | 9/2008 |
| JP | 2009064643 A | 3/2009 |

* cited by examiner

*Primary Examiner* — Carlos Barcena
(74) *Attorney, Agent, or Firm* — Edwards Wildman Palmer LLP; Peter F. Corless (57) ABSTRACT

The present invention provides a fuel cell stack with a water drainage structure, which can effectively drain condensed water and prevent water from flowing into unit cells by combining an end anode plate (EAP) and an end cathode plate (ECP), which are formed by modifying an anode plate (AP) and cathode plate (CP) respectively. In doing so, the modified anode plate (AP) and cathode plate (CP) are converted into a dummy cell which is positioned at the end portions of the fuel cell stack.

7 Claims, 6 Drawing Sheets

| REFERENCE NUMERAL | 3 | 40 | 200 | 100 | 300 | | | 320 | | | 5 | | | 320 | | | 300 | | | | |
|---|---|---|---|---|---|---|---|---|---|---|---|---|---|---|---|---|---|---|---|---|---|
| | | | | | 60 | 20 | 10 | 60 | 200 | 10 | 30 | 20 | 10 | 60 | 200 | 100 | 60 | 20 | 100 | 40 | 4 |
| ABBREVIATION | EP | GDL | ECP | EAP | GG | CP | AP | GG | ECP | AP | 5-L MEA | CP | AP | GG | ECP | EAP | GG | CP | EAP | GDL | EP |

FUEL CELL STACK WITH WATER DRAINAGE STRUCTURE

CROSS-REFERENCE TO RELATED APPLICATION

This application claims under 35 U.S.C. §119(a) the benefit of Korean Patent Application No. 10-2010-0114180 filed Nov. 17, 2010, the entire contents of which are incorporated herein by reference.

BACKGROUND (a) Technical Field

The present invention relates to a fuel cell stack having a water drainage structure. More particularly, it relates to a fuel cell stack having a water drainage structure, which can effectively drain condensed water and prevent water from flowing into unit cells by combining an end anode plate (EAP) and an end cathode plate (ECP), which are formed by modifying an existing anode plate (AP) and cathode plate (CP) respectively into a dummy cell, and positioning the dummy cell at an end cell portion.

(b) Background Art

A fuel cell is an electricity generation system that electrochemically converts the chemical energy directly into electrical energy in a fuel cell stack instead of converting chemical energy of fuel into heat by combustion. Notably, the reactants flow into the cell, and the reaction products flow out of it, while the electrolyte remains within it. In certain embodiments, the fuel cell can be as an electric power supply source of small-sized electrical and electronic devices, for example portable devices, as well as industrial and household appliances and vehicles.

Batteries and fuel cells are different in that in a fuel cell the reactant from an external source is consumed and must be replenished, i.e. it is a thermodynamically open system. In contrast, batteries, store electrical energy chemically and hence represent a thermodynamically closed system which does not consume a reactant from an external source.

Many combinations of fuels and oxidants are possible. For example, a hydrogen fuel cell uses hydrogen as its fuel and oxygen (usually from air) as its oxidant. One of the most widely used fuel cells for a vehicle is a proton exchange membrane fuel cell or a polymer electrolyte membrane fuel cell (PEMFC), which includes a fuel cell stack having a membrane electrode assembly (MEA), a gas diffusion layer (GDL), a gasket, a sealing member and one or more bipolar plates (BP). More specifically, the MEA includes a polymer electrolyte membrane through which hydrogen ions (i.e., protons) are transported. An electrode/catalyst layer, in which an electrochemical reaction takes place, is disposed on each of both sides of the polymer electrolyte membrane. The GDL functions to uniformly diffuse reactant gases and transmit generated electricity and the gasket functions to provide an appropriate airtightness to reactant gases and coolant. The sealing member, on the other hand, functions to provide an appropriate bonding pressure. Finally, each bipolar plate functions to support the MEA and GDL, collect and transmit generated electricity, transmit reactant gases, transmit and remove reaction products, and transmit coolant to remove reaction heat, etc.

In particular, the fuel cell stack is composed of a plurality of unit cells, each of the unit cells including an anode, a cathode, and an electrolyte (electrolyte membrane). Hydrogen as fuel is supplied to the anode through a flow field of the anode plate (AP) and oxygen as oxidant is supplied to the cathode through a flow field of a cathode plate (CP). The hydrogen supplied to the anode is dissociated into hydrogen ions (protons, $H^+$) and electrons ($e^-$) by a catalyst disposed in the electrode/catalyst layer. The hydrogen ions are transmitted to the cathode through the electrolyte membrane, which is a cation exchange membrane, and the electrons are transmitted to the cathode through the GDL and the bipolar plate. At the cathode, the hydrogen ions supplied through the electrolyte membrane and the electrons transmitted through the bipolar plate react with the oxygen in the air supplied to the cathode to produce water. Migration of the hydrogen ions causes electrons to flow through an external conducting wire, which generates electricity and heat.

Figure 5:
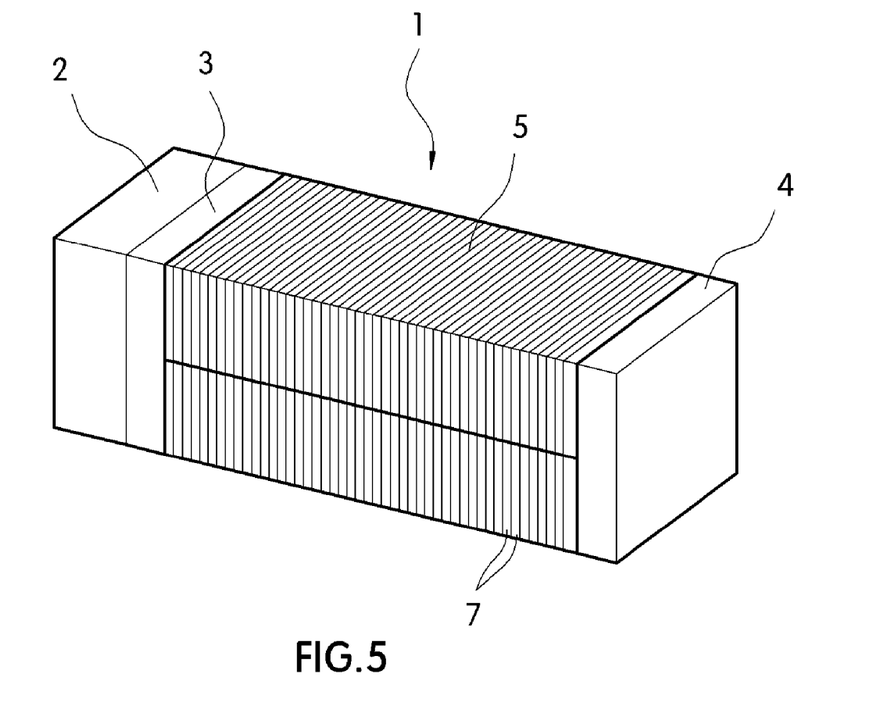
FIG. 5 is a schematic diagram showing the configuration of a typical fuel cell stack.
Figure 6:
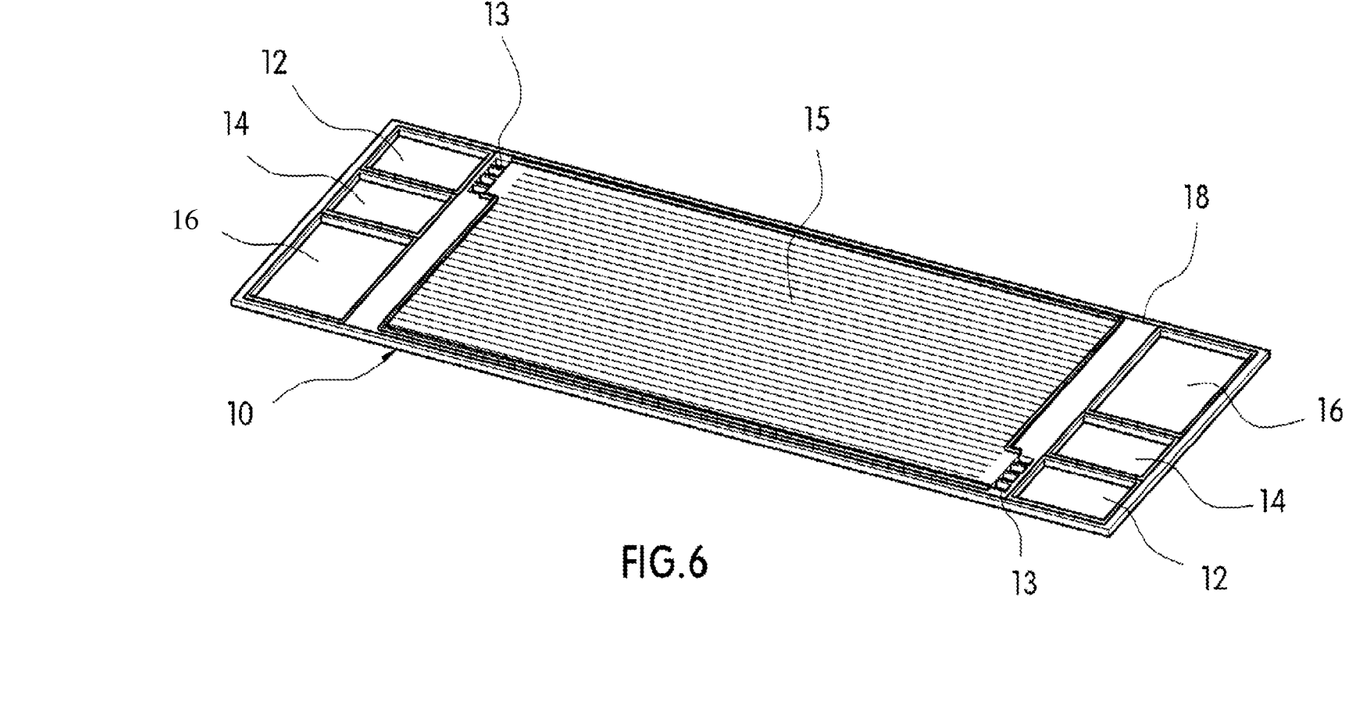
FIG. 6 is a perspective view showing a conventional anode plate (AP).

FIG. 5 shows an example of a typical fuel cell stack 1, and FIG. 6 shows an anode plate (AP) 10, one of bipolar plates (BP) used in the fuel cell stack 1.

The fuel cell stack 1 has a structure in which a plurality of unit cells 5 are connected to each other in series, in which air and hydrogen required to generate electricity are supplied to and discharged from one end of the fuel cell stack 1.

In detail, the air and hydrogen may be fed into an open end plate (EP) 3 with manifold apertures through a common distribution manifold 2, circulated through a power generation unit 7, and discharged through the open EP 3. Here, in a cathode loop, the air is supplied to the fuel cell stack 1 through a humidifier (not shown) and is then discharged to the outside of the vehicle through the humidifier. Moreover, in an anode loop, the hydrogen is supplied from a hydrogen tank (not shown) to the fuel cell stack 1 through a fuel processing system (FPS, not shown), and the residual hydrogen discharged from the fuel cell stack 1 is continuously circulated through the FPS and the fuel cell stack 1.

Each unit cell 5 of the power generation unit 7 has a structure in which the anode plate (AP), a first GDL, the MEA, a second GDL, and the cathode plate (CP) are sequentially stacked. As shown in FIG. 6, each of the anode plates (AP) 10 and the cathode plates (CP) comprises manifolds 12, 14, and 16 provided at both ends thereof, through which hydrogen, coolant, and air pass, respectively.

In the case of the anode plate (AP) 10, as shown in FIG. 6, hydrogen inlet/outlet apertures 13 connected to the hydrogen manifold 12 are formed such that the hydrogen can pass through a hydrogen flow field 15 formed on a reaction surface of the anode plate (AP) 10. A gasket 18 surrounding the outer edges of the anode plate (AP) 10 and the manifolds 12, 14, and 16 maintains the airtightness of fluids passing through the manifolds 12, 14, and 16 and the hydrogen flow field 15, and thus only the hydrogen passing through the hydrogen manifold 12 can be supplied to the hydrogen flow field 15 through the hydrogen inlet/outlet apertures 13. Moreover, in the case of the cathode plate (CP), air inlet/outlet apertures connected to the air manifold 16 are formed in the same manner, such that the air can pass through an air flow field formed on a reaction surface of the cathode plate (CP).

Meanwhile, during the above-described circulation process of the fuel cell stack, condensed water may be fed into a cathode inlet of the power generation unit through a humidifier, a common distribution manifold, an end plate, and the bipolar plate manifold. In doing so, the condensed water passes through the FPS, the common distribution manifold, the end plate, and the bipolar plate manifold. However, any water passing through the MEA may be fed from an anode inlet verses a cathode inlet.

In this case, the water flows into the outermost unit cells that are in contact with the open EP 3 to cause a rapid repetitive increase and decrease in cell voltage and a deterioration of MEA catalyst due to the presence of a large amount of water in the unit cells, which may specifically be a serious problem in the anode loop as it is a closed loop. Moreover, because the outermost unit cells adjacent to a close EP 4 have no manifold apertures, when the hydrogen or air is supplied through an inlet manifold of the bipolar plate, the water condensed in the manifold in the lengthwise direction of the fuel cell stack may flood into the closed EP 4 and thus be fed into the outermost unit cells.

Removal of the condensed water from the fuel cell stack other than the water required to humidify the MEA is a very important in terms of performance stability and durability of the fuel cell vehicle. Therefore, conventionally, a water trap, for example, may be provided to perform the water removal. However, this method does not remove the water as effectively as the industry would hope.

Moreover, U.S. Pat. No. 7,163,760 discloses a fuel cell stack having a bypass flow passage, in which a bypass plate and an intermediate plate are separately provided at an end portion (such as an end cell and an end plate) of a power generation unit of the fuel cell stack such that condensed water, which may flood into the power generation unit when hydrogen or air is supplied, is not fed into the power generation unit but discharged to the outside of the fuel cell stack. However, according to the above-described configuration, the bypass plate and the intermediate plate should be separately developed and added to the fuel cell stack, and thus the overall configuration of the fuel cell stack is further complicated when this method is utilized thereby indirectly increasing the overall costs of production. Thus, a cost efficient system and method for removal of the condensed water in a fuel cell stack is needed.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a fuel cell stack having a water drainage structure, which can effectively drain condensed water and prevent water from flowing into unit cells by forming the same structure as an existing unit cell of the fuel cell stack and positioning the structure at an end cell portion of the fuel cell stack.

In one aspect, the present invention provides a fuel cell stack having a water drainage structure which has a plurality of unit cells disposed between end plates at both ends of the fuel cell stack. More specifically, the present invention utilizes a cathode dummy cell and at least one anode dummy cell, as cells for draining water from the fuel cell stack. These dummy cells are disposed between end cells of a power generation unit and the end plates at both ends of the fuel cell stack.

In some embodiments, the cathode dummy cell is made up of a cathode plate and an end anode plate and the anode dummy cell is made up of an anode plate and an end cathode plate.

In another embodiment, the end anode plate of the cathode dummy cell is formed by removing hydrogen inlet/outlet apertures of the anode plate. Likewise, the end cathode plate is formed by removing air inlet/outlet apertures of the cathode plate.

In still another embodiment, the fuel cell stack also has a first gas diffusion layer disposed between the cathode plate and the end anode plate of the cathode dummy cell and a second gas diffusion layer disposed between the anode plate and the end cathode plate of the anode dummy cell.

In yet another embodiment, each of the cathode dummy cell and the anode dummy cell do not have a membrane electrode assembly but rather a gas diffusion layer assembly in which two gas diffusion layers are bonded to each other.

In still yet another embodiment, an end cathode plate or an end anode plate, acting as a dummy end plate, is further disposed on the end cells or on the dummy cells, which are in contact with the end plates at both ends of the fuel cell stack.

In a further embodiment, the fuel cell stack further comprises a gas diffusion layer disposed between the end plates at both ends of the fuel cell stack and the dummy end plates.

Other aspects and embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Reference numerals set forth in the Drawings includes reference to the following elements as further discussed below:

| | |
|---|---|
| 1: fuel cell stack | 2: common distribution manifold |
| 3: open end plate (EP) | 4: close end plate (EP) |
| 5: unit cell | 7: power generation unit |
| 10: anode plate (AP) | 20: cathode plate (CP) |
| 30: 5-layer MEA | 40: gas diffusion layer (GDL) |
| 60: gas diffusion layer assembly (GG) | |
| 100: end anode plate (EAP) | 120: hydrogen manifold |
| 140: coolant manifold | 160: air manifold |
| 180: gasket | 200: end cathode plate (ECP) |
| 300: cathode dummy cell | 320: anode dummy cell |

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Figure 1:
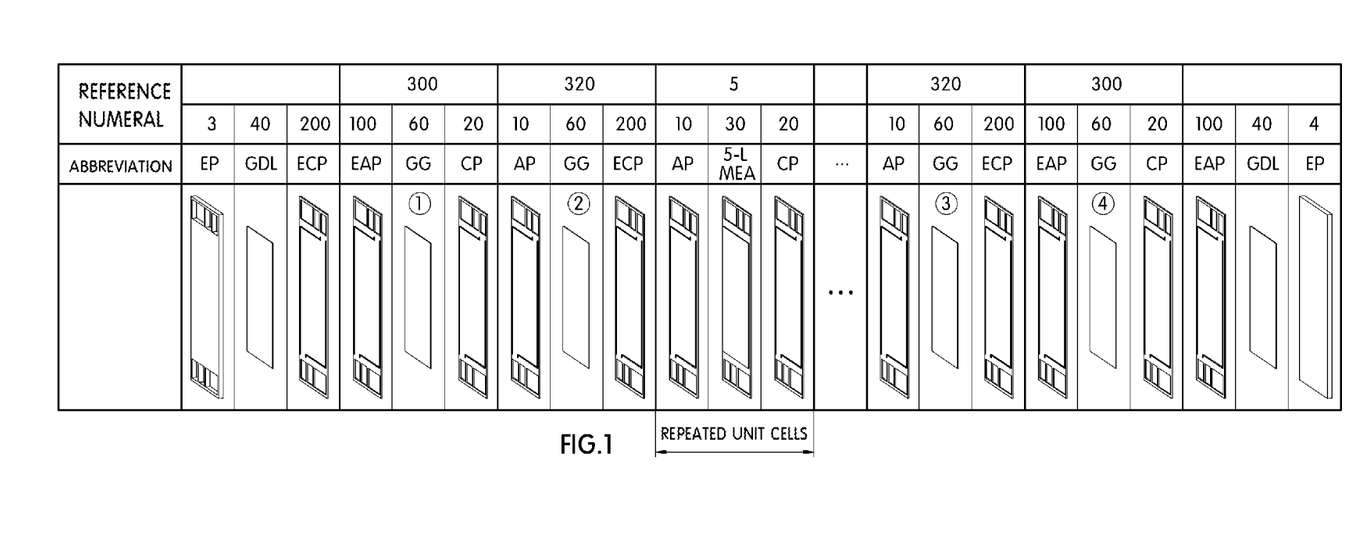
FIG. 1 is a schematic diagram showing the configuration of a fuel cell stack in accordance with an exemplary embodiment of the present invention.
Figure 2:
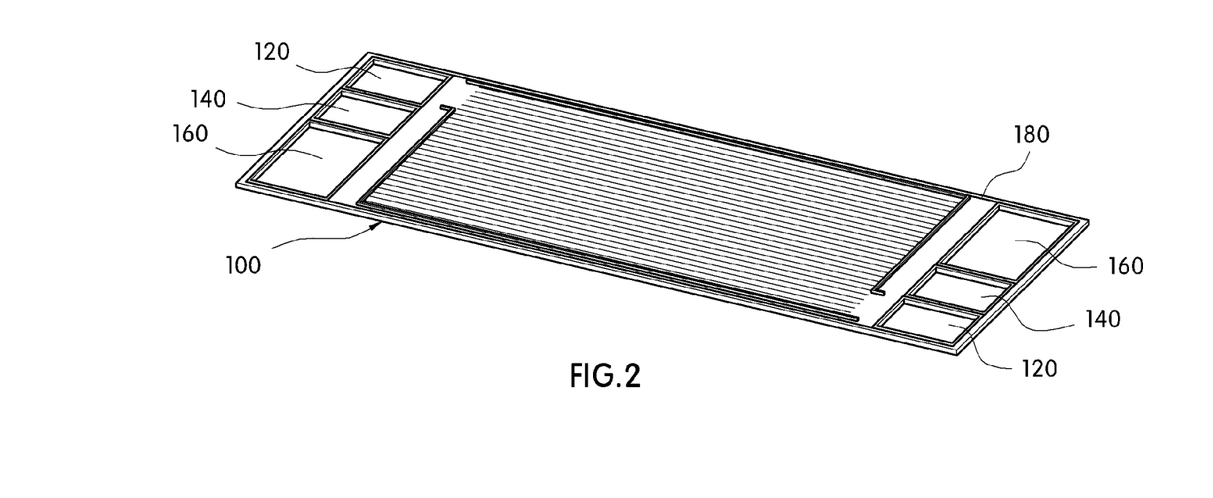
FIG. 2 is a perspective view showing an end anode plate (EAP) in accordance with an exemplary embodiment of the present invention.

FIG. 1 is a schematic diagram showing the configuration of a fuel cell stack in accordance with an exemplary embodiment of the present invention, and FIG. 2 is a perspective view showing an end anode plate (EAP) in accordance with an exemplary embodiment of the present invention.

The fuel cell stack according to the present invention utilizes a dummy cell disposed between an end cell of a power generation unit and an end plate (EP) on each respective end of the fuel cell stack. Typically, a unit cell is made up of an anode plate (AP), a first gas diffusion layer (GDL), a membrane electrode assembly (MEA), a second GDL, and a cathode plate (CP), which are stacked in this order respectively. However, the dummy cell used in the illustrative embodiments of the present invention may be a cathode dummy cell (CD)) or an anode dummy cell (AD) cell. If it is a cathode dummy cell, the cell is made up of a cathode plate (CP) and an end anode plate (EAP). Conversely, if the dummy cell is an anode dummy cell, the cell is made of an anode plate (AP) and an end cathode plate (ECP).

The end anode plate (EAP) and the end cathode plate (ECP) used in the present invention are formed without any hydrogen inlet/outlet apertures and air inlet/outlet apertures. For example, referring to FIG. 2, the end anode plate 100 in accordance with the illustrative embodiment of the present invention does not include any hydrogen inlet/outlet apertures connected to a hydrogen manifold 120, and thus the hydrogen gas passing through the hydrogen manifold 120 is blocked by a gasket 180 and does not flow into a reaction surface of the end anode plate 100. Likewise, the end cathode plate (ECP) in accordance with the embodiment of the present invention also does not include air inlet/outlet apertures connected to an air manifold 160, and thus the air passing through the air manifold 160 does not flow into a reaction surface of the end cathode plate (ECP).

Accordingly, the dummy cell in accordance with the illustrative embodiment of the present invention is provided to drain water from the fuel cell stack without a chemical reaction occurring from the anode and cathode respectively. More particularly, in the anode dummy cell (AD), hydrogen is fed through the anode plate (AP), but air is not fed through the end cathode plate (ECP). Therefore, the chemical reaction does not take place in the fuel cell stack and water is drained from the anode. Likewise, in the cathode dummy cell (CD), air is fed through the cathode plate (CP), but hydrogen is not fed through the end anode plate (EAP). Therefore, the chemical reaction does not take place in the fuel cell stack and water is drained from the cathode.

Furthermore, in some embodiments of the present invention, a gas diffusion layer (GDL) may be further disposed between the cathode plate (CP) and the end anode plate (EAP) of the cathode dummy cell (CD). The GDL functions to maintain electrical contact between bipolar plates. Moreover, the GDL in the cathode dummy cell (CD), in which no MEA is provided, functions to fill the inner space of the unit cell in accordance with the thickness of the unit cell after compression of the gasket 180, thus maintaining structural stability. Preferably, a gas diffusion layer assembly (GG) in which two gas diffusion layers (GDLs) are bonded to each other may be provided in the cathode dummy cell (CD), thereby maintaining structural stability in accordance with the thickness of the unit cell. The GDL may be disposed between the anode plate (AP) and the end cathode plate (ECP) of the anode dummy cell (AD) in the same manner as the cathode dummy cell (CD).

FIG. 1 shows the configuration of a fuel cell stack in which the above-described dummy cells are arranged in accordance with an illustrative embodiment of the present invention. As shown in the figure, the cathode dummy cell 300 or the anode dummy cell 320 may be disposed between the end cells and the end plates of the power generation unit in which a plurality of unit cells 5 are repeated.

Here, reference numeral 30 denotes a 5-layer MEA in which a first GDL, a 3-layer MEA, and a second GDL are stacked in this order. Reference numeral 60 denotes a GDL assembly (GG), in which two GDLs are bonded to each other. Although FIG. 1 shows an example in which an open EP 3 and a closed EP 4 are provided at different ends of the fuel cell stack, respectively, the open EP 3 may be disposed at both ends of the fuel cell stack, and the configuration of the unit cells may be reversed according to the plus (+) and minus (−) direction of the stack module.

The illustrative embodiment of FIG. 1 shows the configuration of the fuel cell stack, in which the open EP 3, the cathode dummy cell 300, the anode dummy cell 320, the plurality of repeated unit cells 5, the anode dummy cell 320, the cathode dummy cell 300, and the close EP 4 are stacked in this order. In this embodiment, only air is fed into the cathode dummy cell 300 stacked on the open EP 3, and only hydrogen is fed into the anode dummy cell 320. Therefore, most of the water flowing through the air manifold 160 of the open EP 3 can be discharged to the outlet of the fuel cell stack through the cathode dummy cell 300, and the water flowing through the hydrogen manifold 120 of the open EP 3 can be discharged to the outlet of the fuel cell stack through the anode dummy cell 320a.

Moreover, the water condensed in the manifold in the lengthwise direction of the fuel cell stack and flowing through the closed EP 4 can be discharged through the cathode dummy cell 300 and the anode dummy cell 320 stacked on the closed EP 4 in the same manner as above. Therefore, according to the present invention, it is possible to prevent the water from flowing into the end cells located at the outermost ends of the power generation unit, and thus it is possible to effectively remove the water flowing through the fuel cell stack.

In the fuel cell stack according to the present invention, the cathode dummy cell 300 and the anode dummy cell 320 may be stacked in various combinations. That is, the fuel cell stack may be configured in various combinations and numbers as long as at least one cathode dummy cell 300 and at least one anode dummy cell 320 are disposed between the end cells of the power generation unit and the end plates 3 and 4 at both ends thereof.

In addition, according to another embodiment of the present invention, an end cathode plate 200 or an end anode plate 100 as a dummy end plate may be further disposed on the ends cells of the power generation unit or on the dummy cells themselves. As can be seen from the illustrative embodiment the end cathode plate 200 and the end anode plate 100 are each in contact with the end plates 3 and 4 at both ends of the fuel cell stack respectively. In this embodiment, the dummy end plates may be bonded to the outermost bipolar plates of the end cells or the dummy cells, which are in contact with the end plates 3 and 4, thereby forming coolant flow fields. Moreover, since the dummy end plates comprise the end cathode plate 200 or the end anode plate 100, the fuel cell stack is configured so that hydrogen or air do not flow into one or more current collectors at the end plates 3 and 4.

Moreover, according to the embodiment of the present invention, the GDL 40 may be further disposed between the outermost bipolar plates (the dummy end anode plate or the dummy end cathode plate) of the end cells of the power generation unit or the dummy cells and the end plates 3 and 4 or between the dummy end plates and the end plates 3 and 4. Because the GDL 40 formed of a conductor is inserted therebetween, the electrical contact between the current collector inserted into the end plates 3 and 4 and the outermost bipolar plates (or dummy end plates) can be established.

As such, the fuel cell stack according to the present invention is provided with a water drainage structure which can be achieved in a cost effective and efficient manor. That is, the end anode plate (EAP) and the end cathode plate (ECP) used in the present invention are formed without hydrogen (or air) inlet/outlet apertures. That is, manufacture of this drainage method is relatively cost effective because these new dummy end plates can be manufactured in relatively the same fashion as the other bipolar plates in the fuel cell stack. As a result, the manufacturing process can be simplified and the condensed water can be effectively drained.

Figure 3:
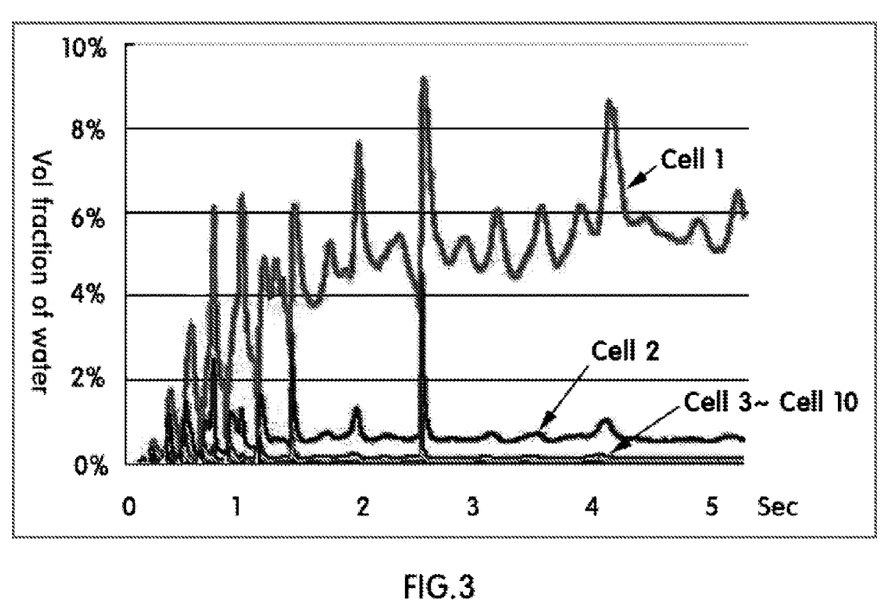
FIG. 3 is a graph showing a change in the amount of water flowing from an open end plate (EP) into unit cells in a conventional power generation unit having a typical cell configuration.
Figure 4:
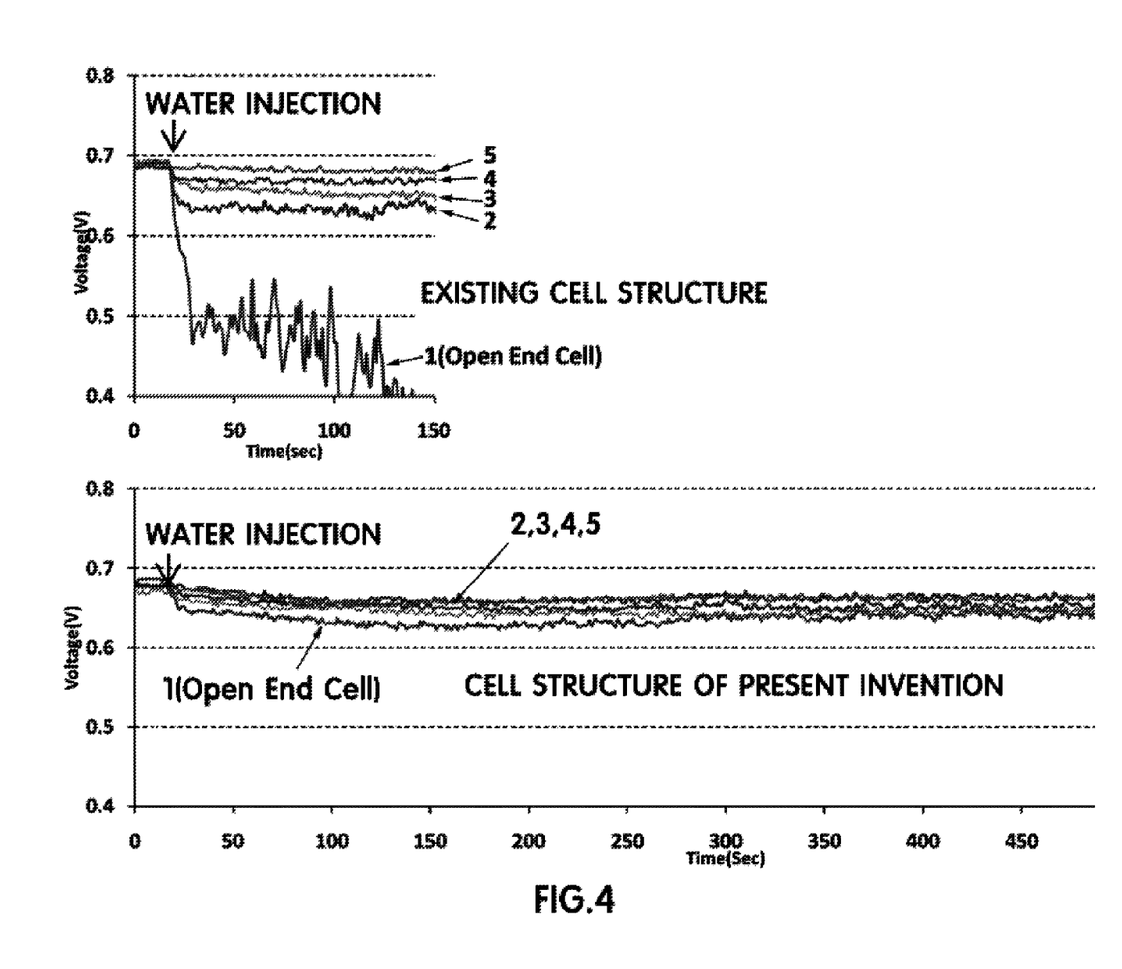
FIG. 4 is a graph showing a change in cell voltage in a conventional fuel cell stack and in a fuel cell stack in accordance with an embodiment of the present invention during artificial water injection.

The effects of the fuel cell stack according to the embodiments of the present invention are shown in FIGS. 3 and 4. FIG. 3 shows a change in the amount of water flowing from the open EP into the unit cells in a conventional power generation unit having a typical cell configuration, and FIG. 4 shows a change in cell voltage in a conventional fuel cell stack and in a fuel cell stack in accordance with the illustrative embodiment of the present invention during artificial water injection.

As shown in FIG. 3, it can be seen that, when water flows into a conventional fuel cell stack, most of the water is fed into a first unit cell within 1 to 2 seconds, a significant amount of water is fed into a second unit cell, and almost no water is fed into the next unit cells. Therefore, it is expected that, when the water such as condensed water is fed into the fuel cell stack, the unit cells at the outermost ends (i.e., at the end cell portion) are most vulnerable to water.

FIG. 4 shows the change in cell voltage in a conventional fuel cell stack and in a fuel cell stack in accordance with the illustrative embodiment of the present invention in the case where water is injected through anode inlets at 30 g/sec, which is a malicious condition. In the conventional fuel cell stack, the performance (i.e., the voltage) of a first unit cell was rapidly reduced upon injection of water and that of a second unit cell was also reduced. However, in the fuel cell stack of the present invention, a rapid reduction in performance (i.e., voltage) of unit cells adjacent to the end cell portion was not observed even after several hundreds of seconds. The reason for this is that most of the water is fed into the dummy cell provided by the present invention and immediately discharged, and thus the amount of water flowing into the unit cells in the power generation unit is minimized. Therefore, according to the fuel cell stack of the present invention, it is possible to minimize the instability of the performance of the unit cells due to the water fed into the fuel cell stack in an actual vehicle and prevent the deterioration of MEA catalyst due to the presence of a large amount of water in the unit cells.

As described above, according to the fuel cell stack with the water drainage structure of the present invention, in which the dummy cell is configured by combining an end anode plate (EAP) and an end cathode plate (ECP) with an anode plate (AP) and a cathode plate (CP) and positioned at the end cell portion, it is possible to effectively drain condensed water and prevent water from flowing into the unit cells of the fuel cell stack.

Moreover, the end anode plate (EAP) and the end cathode plate (ECP) used in the present invention are formed without hydrogen inlet/outlet apertures and air inlet/outlet apertures as would be found in existing anode plates (AP) and cathode plates (CP). As a result, it is possible to simplify the manufacturing process and reduce the manufacturing cost.

The invention has been described in detail with reference to embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack having a water drainage structure, the fuel cell stack comprising a plurality of unit cells disposed between end plates at both ends of the fuel cell stack respectively, wherein at least one cathode dummy cell and at least one anode dummy cell are included in the fuel cell stack, the at least one cathode dummy cell and the at least one anode dummy cell provided for draining water from the fuel cell stack and are disposed between end cells of a power generation unit and the end plates at both ends of the fuel cell stack.

2. The fuel cell stack of claim 1, wherein the cathode dummy cell comprises a cathode plate and an end anode plate and the anode dummy cell comprises an anode plate and an end cathode plate.

3. The fuel cell stack of claim 2, wherein the end anode plate is formed without hydrogen inlet/outlet apertures and the end cathode plate is formed without air inlet/outlet apertures.

4. The fuel cell stack of claim 2, further comprising a gas diffusion layer disposed between the cathode plate and the end anode plate of the cathode dummy cell and between the anode plate and the end cathode plate of the anode dummy cell.

5. The fuel cell stack of claim 4, wherein each of the cathode dummy cells and the anode dummy cells comprise only a gas diffusion layer assembly in which two gas diffusion layers are bonded to each other.

6. The fuel cell stack of claim 1, wherein an end cathode plate or an end anode plate as a dummy end plate is further disposed on end cells or on the dummy cells, which are in contact with the end plates at both ends of the fuel cell stack.

7. The fuel cell stack of claim 6, further comprising a gas diffusion layer disposed between the end plates at both ends of the fuel cell stack and the dummy end plates.

* * * * *